United States Patent [19]

Slusarczyk

[11] 4,262,863
[45] Apr. 21, 1981

[54] POWERED HANG GLIDER WITH REDUCTION DRIVE

[76] Inventor: Charles J. Slusarczyk, 4200 Royalton Rd., Brecksville, Ohio 44141

[21] Appl. No.: 869,833

[22] Filed: Jan. 16, 1978

[51] Int. Cl.³ .............................................. B64C 1/16
[52] U.S. Cl. ...................................... 244/13; 244/54; 244/55; 244/DIG. 1
[58] Field of Search ....................... 244/13, 16, 54, 55, 244/60, DIG. 1, 153 R, 154, 45; 46/74 R, 78, 93, 76 R, 77; 115/1 C

[56] References Cited

U.S. PATENT DOCUMENTS

| D. 243,594 | 3/1977 | Koch | 244/DIG. 1 |
|---|---|---|---|
| 591,211 | 10/1897 | Daberer | 244/154 |
| 983,868 | 2/1911 | Bellville | 244/13 |
| 991,620 | 5/1911 | Hughes | 244/13 |
| 1,011,604 | 12/1911 | French | 244/13 |
| 1,175,307 | 3/1916 | Schroeder | 244/13 |
| 1,189,610 | 7/1916 | Morris | 244/45 R |
| 1,443,368 | 1/1923 | Lamblin | 115/1 C |
| 2,234,758 | 3/1941 | Goldberg | 46/78 |
| 2,395,143 | 2/1946 | Prewitt | 244/54 |
| 3,195,837 | 7/1965 | Alvarez-Calderon | 244/55 |
| 3,744,180 | 7/1973 | Mabuchi | 46/78 |
| 4,005,673 | 2/1977 | Carrero | 115/1 C |
| 4,067,515 | 1/1978 | Searle | 244/16 |

FOREIGN PATENT DOCUMENTS 1206392  9/1970  United Kingdom ..................... 244/60

OTHER PUBLICATIONS

*Glider Rider*, 1977, p. 14.
Poynter, "Hang Gliding", pp. 138, 190-191, 1976.

*Primary Examiner*—Galen L. Barefoot
*Attorney, Agent, or Firm*—Alfred D. Lobo

[57] ABSTRACT

A foot-launched and foot-landed hang glider is powered by an internal combustion two-cycle engine drivingly connected through a reduction-drive unit to a large relatively slow-moving propeller. A reduction mount, so referred to because it couples the reduction-drive unit closely to the engine, allows the engine to rotate a large propeller relatively slowly, thus providing more thrust at near-stalling flight conditions. The hang glider, thus powered, also obviates the necessity of being launched from the edge of a precipice and permits flight which is not predicated on the fortuitous selection of favorable air currents.

3 Claims, 7 Drawing Figures

POWERED HANG GLIDER WITH REDUCTION DRIVE

BACKGROUND OF THE INVENTION

Hang gliders and hang gliding are as old as man's first dreams of simulating the flight of birds. However, it is only recently that successful hand gliders have burst upon the horizon, made possible by the availability of a unique combination of high strength synthetic resinous fabric and film, and light-weight high-strength rigid structural components.

A hang glider is defined as: "An un-powered single place vehicle whose launch and landing capability depends entirely on the legs of the occupant, and whose ability to remain in flight is generated by natural air current only" (see FAA Advisory Circular 60-10 published May 16, 1974). It is such a craft, which is powered by an engine now combined surprisingly effectively with a reduction drive unit, which is the subject matter of this invention.

The essential requirements of any winged aircraft in the 25-35 mph (miles per hour) range have been generally ignored since the Wright brothers powered a low-speed glider. This attitude is understandable because, logically, having learned to power a craft, the goal to be attained was ever-greater speeds. Subsequent world wars placed an additional premium on speed, and as a result, data on low-speed, winged, powered aircraft are virtually non-existent.

Since reliance for relatively safe flight solely upon the vagaries of air currents presents an undesirably high level of risk, it was inevitable that this reliance be better founded. An obvious way of providing a more reliable source of air currents is to power a hang glider with a small engine, and this has been done. Particularly in those parts of this country where the land stretches flatly to the horizons, powered or motorized hang gliders have been used in which an engine directly drives a propeller which is mounted on the crankshaft of the engine. These direct-drive powered hang gliders are not without problems. In simple terms it might be said that known, powered direct-drive hang gliders have delicate handling characteristics because they fly at near-stalling speed, a condition arising from the limited thrust of the necessarily small engine. To maximize thrust, a directly driven propeller is rotated as fast as the small engine will permit. Because of the weight limitation of a hang glider, it must be powered by a light-weight two-cycle internal combustion engine operating in the range from about 6500 revolutions per minute (rpm) to about 10,000 rpm. The handling problem of a powered hang glider is particularly acute at lift-off because, though the relatively small diameter propeller of a direct-drive engine rotates at high speed, there is insufficient reserve thrust to provide an adequate safety margin at lift-off. In other words, a small diameter direct-drive propeller does not provide sufficient thrust to make a quick and controlled transition from launch speed to the minimum safe control speed for the craft. Though this problem would appear to lend itself to a simple substitution involving using a more powerful engine, the fact is that such a substitution is impractical. The weight of a two-cycle engine having a rated brake horsepower greater than about 15 HP, even if cast from aluminum or other light weight alloy, is too great. Since a hang glider must be foot-launched and foot-landed, the critical weight of an engine to power it, is limited to 20 pounds (lbs). Thus, in powered hang glider design, the weight of an engine is essentially constant. Because launching a hang glider is accomplished by a person lifting it up and running with it to commence to lift off the ground, the weight of the enigne and hang glider together should not exceed 100 lbs.

The power of the two-cycle engine and its weight are critical factors because there is no known engine obviously suitable for the purpose of powering a hang glider, which engine can provide substantially greater power per pound weight, so as to rotate a large propeller slowly, without using a reduction-drive. These critical factors necessitate present direct-drive driven hang gliders to be operated without a muffler on the engine, so as to provide a reasonable margin of safety in making the transition from launch speed to crusing speed. Such an un-muffled engine requires the occupant pilot to use ear plugs or the like. It should also be recognized that the noise generated by a relatively small, high-revving propeller is so great that ear protective devices would be necessary even if the engine was quiet. A slow-revving propeller in the range from about 0.9 meter (m) to about 1.4 m, revolving at a speed in the range from about 2500 rpm, but below 5000 rpm, is relatively quiet. Because the engine provides more usable thrust with a large propeller driven with a reduction-drive unit, the engine may be adequately muffled so that the hang glider may be flown without ear plugs.

Recognizing that the cruise speed of a powered hang glider is in the range from about 25 to 35 miles per hour (mph) with a maximum speed of about 40 mph, it is essential that the transition from ground running speed of about 8 to 10 mph, to cruise speed, be made as quickly as possible. Since the stall speed is about 20 mph, it will now be appreciated that it is desirable to have as much reserve thrust as possible above a level required to maintain the hang glider in sustained flight. It is this reserve thrust which is lacking in a direct-powered hang glider.

Despite the inadequacies of direct-drive powered hang gliders, those skilled in the art have continued to use them, methodically attempting to overcome the problems . . . but with little success. The powered hang glider of this invention provides an effective solution to the problem of direct-powered hang gliding.

SUMMARY OF THE INVENTION

It has been discovered that, for foot-launched and foot-landed powered single place vehicles, a reduction-drive unit drivingly engaging a two-cycle, internal combustion engine with a large, relatively slow-moving propeller, unexpectedly provides smooth, controllable flight at speeds just greater than "stall-speed", with a surprisingly low level of vibration.

It has also been discovered that a unique mounting bracket permits adapting a reduction-drive means to transmit power from a high-revving two-cycle engine, to a slow-revving large propeller.

It is therefore a general object of this invention to provide a powered hang glider operating in the range from about 25 mph to about 35 mph at crusing speed, having a two-cycle internal combustion engine drivingly engaged with a reduction-drive unit for rotating a propeller shaft which is longitudinally axially mounted close to and essentially parallel to the center line of the crankshaft of the engine. The propeller shaft rotates a fixed pitch propeller having a diameter in the range from about 36 in. to about 54 in. and a pitch in the range from 9 in. to about 16 in.

It is a specific object of this invention to provide a powered hang glider in which a light-weight two-cycle engine, weighing less than about 20 pounds (lbs), and a complementary reduction-drive unit, may be mounted either fore or aft on the structural framework of the glider; and the propeller may be mounted fore or aft, independently of the position of the engine.

It is another specific object of this invention to reduce the level of vibration, and its resultant effects on the fabric and air-frame, by providing a large, slow, propeller revolving at speeds in the range from about 2500 revolutions per minute (rpm) to no more than 5000 rpm, driven by an engine operating in the range from about 6500 rpm to about 10,000 rpm.

It is yet another specific object of this invention to provide a large, slowly revolving propeller driven by a simple reduction-drive unit mounted with a unique mounting means to a two-cycle, high revving engine so as to permit vibrations to the air-frame to be damped by plural elastomeric motor mounts.

BRIEF DESCRIPTION OF THE DRAWINGS

The foregoing and other objects and advantages of my invention will appear more fully from the following description, made in connection with the accompanying drawings, of preferred embodiments of the invention, wherein like reference characters refer to the same or similar parts throughout the several views and in which:

FIG. 7 is a perspective partial elevational view schematically illustrating the struts of the occupant positioning means or cage, such as is used in the bi-plane hang glider shown in FIG. 1. The upper portions of the struts where they are secured to the air-frame are shown broken away.

DETAILED DESCRIPTION OF PREFERRED EMBODIMENTS OF THE INVENTION

Figure 1:
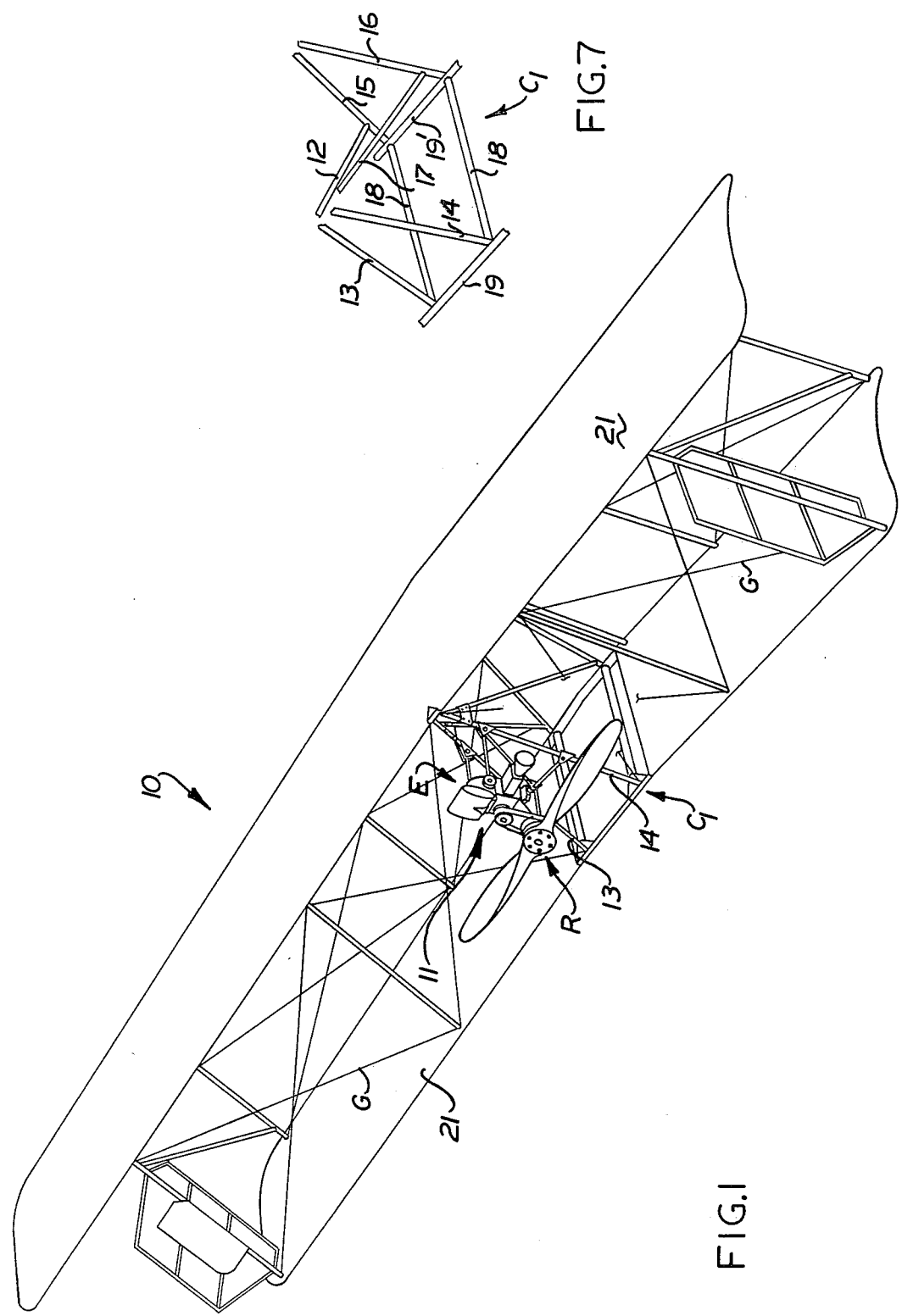
FIG. 1 is a perspective obliquely downward view of a bi-plane hang glider as viewed from the rear, that is, facing the direction of its flight.

As has been stated hereinbefore, the availability of modern materials, such as high-strength fabrics woven from fibers of Dacron* polyesters, Nylon polyamides, various acrylonitrile polymers and the like, secured to air-frames made of light-weight high-strength tubing, has literally given wings to man's impulse to fly without power. The proliferation of glider aircraft with landing gear attests to the popularity of gliding in a relatively large and safe aircraft which is launched by towing with a vehicle. Through the principles of aerodynamic design are equally applicable to all aircraft, the criteria for the design and operation of an unpowered glider are quite different from those for other powered aircraft. Similarly, the criteria for design and operation of a powered hang glider are quite different from those for an unpowered one. A paramount consideration is that a powered hang glider must be relatively safe to operate, and because it is highly sensitive to flight conditions which are easily altered, it is desirable to provide as manageable a machine as possible. To this end, controlled power within a stable narrow range above stall speed, and, damping of vibrations are of transcendental importance.

The difficulty in predicting the effect of design modifications on a powered hang glider is that I know of no theoretical basis upon which to estimate the unsteady state dynamics of a powered hang glider, or how to achieve controlled flight conditions in the stable range. Despite all efforts to estimate theoretically how a powered hang glider will perform, the only way to learn the effect of design changes is to test them in actual flight. Thus, there is no reasonably accurate way of predicting the effects of substituting a relatively slowly revolving, large propeller powered by a relatively high speed engine, for a relatively fast, small propeller. Further, having decided to make such a substitution, it is a unique design feature of this invention that the propeller shaft is mounted for rotation in a bearing held in a unique mounting means which permits vibrations from the propeller to be damped before they are transmitted to the air-frame. The effectiveness of such a substitution is suprisingly enhanced by the engine-mounted reduction-drive unit which permits the axis of rotation of the propeller shaft ("propeller shaft axis") to be no more than 25.4 cm (10 inches) away from, and in parallel spaced apart relationship with the axis of rotation of the engine's crankshaft ("crankshaft axis"). It is essential that the spacing between the crankshaft axis and propeller shaft axis be no greater than the stated distance. The particular components of the reduction-drive unit are not critical provided they effect the desired reduction of crankshaft speed in the speed of the propeller shaft at a distance les than or equal to 25.4 cm (10 inches).

The reduction drive unit may comprise a drive gear fixedly disposed on the end of the engine's crankshaft, a driven gear fixedly disposed near one end of the propeller shaft, and an intermediate gear engaging the drive gear, and drivingly engaging the driven gear, so that the direction of rotation of the driven gear is counter to that of the crankshaft. The reduction-drive unit may also comprise a flexible driving member such as a belt or chain, drivingly engaging a drive member on the crankshaft and a driven member on the propeller shaft; for example, a chain drivingly engaging a drive sprocket on the crankshaft and a driven sprocket on the propeller shaft, or, a V-belt drivingly engaging a drive sheave on the crankshaft and a driven sheave on the propeller shaft.

Preferably, the reduction-drive unit comprises a first, relatively small timing gear which is the driving gear, on the crankshaft of the engine; a second, relatively large timing gear which is the driven gear on the propeller shaft; and, a timing belt drivingly engaging the drive and driven timing gears. This arrangement, provided the axes of the drive gear and driven gear are no further than 25.4 cm allows an effective utilization of power for flight in a stable range. This effectiveness is attributable to the relatively low mass of the reduction-drive unit, yet the mass is sufficient to provide a "flywheel action" for the engine, which action is essential to permit the engine to be started.

Referring now to FIG. 1 for a more detailed description of one preferred embodiment of this invention, there is shown a perspective, obliquely downward view of a powered hang glider having an air-frame of the dual wing or bi-plane category, indicated generally by reference numeral 10, and a power pack, indicated generally by reference numeral 11, which is demountably secured, preferably longitudinally axially, to the air-frame 10. As illustrated in FIG. 1, the view is from the rear, that is, facing the direction of flight. The occupant would grip an air-frame strut 19' and the weight of his lower body would be supported by a strut 19 and a harness supported by the cage. Thus, in flight, the engine is above and behind the occupant. The power pack 11 includes an engine E and reduction-drive unit R. The air-frame 10 comprises a structural framwork of elongated members or struts 12-19' (only some are identified), preferably of tubular light-weight metal or fiber reinforced materials upon which a laminar skin 21 is tightly secured so as to provide an air foil strong enough to support the weight of a single occupant in flight, yet light enough to be lifted off the ground by the occupant, foot-launched and foot-landed. The laminar skin 21 may be a sheet of synthetic resinous flim, but preferably is a woven fabric of nylon, Dacron* or other suitable material no heavier than 6 ounces (oz) per square yard, and preferably weighing about 4 oz/yd$^2$. Sometimes a laminar skin of porous synthetic woven fabric is sewn on to the air-frame and subsequently coated with aircraft paint to seal the pores. Guy wires or cables, indicated by reference symbol G, criss-cross the struts of the air-frame and provide it with desirable strength.

The precise geometry of the air-frame will vary depending upon the general category of the hang glider. A hang glider may be of the single-wing or multiple wing types. A multple wing glider is typically a bi-plane hang glider, and single wing types may be a rigid wing or a flexible wing. The type of air-frame is relevant only to the extent that the air-frame should be air-worthy and provide a central occupant positioning means, which in the bi-plane is indicated generally by reference symbol $C_1$. In the bi-plane hang glider illustrated, the central occupant positioning means $C_1$ is perferably a cage. The cage $C_1$ serves the dual function of providing support for the occupant, and also support for the engine. Typically cage $C_1$ includes plural air-frame struts 12, 13, 14, 15, 16, 17, 18, 18', 19 and 19', which together with the fore and aft wing struts of the upper and lower wings, provides a rigid supporting framework for both occupant and engine. To fulfill the latter function it is essential that the cage of a bi-plane hang glider have the air-frame struts 13 and 14 positioned symmetrically about the vertical axis of the hang glider, for mounting the engine E. The engine E is so mounted that the axis of rotation of the crankshaft of the engine is generally longitudinal, that is, essentialy parallel to the longitudinal axis of the hang glider.

In a preferred design the cage $C_1$ of a bi-plane hang glider, as illustrated, comprises a first forward or "fore" pair of A-shaped, generally vertical, transversely spaced apart and angularly inwardly and forwardly disposed struts 13 and 14; a second rear or "aft" pair of A-shaped generally vertical, transversely spaced apart and angularly inwardly and forwardly disposed struts 15 and 16; and a generally rectangular framework of struts 18, 18', 19, and 19'. Struts 13 and 15 are diagonally secured by the ends of a strut 12, and struts 14 and 16 are similarly diagonally secured by a strut 17. The upper ends of the struts 13-16 are secured to other struts (not specially referenced) in upper wing 25 of the air-frame, and the lower ends of the struts 13-16 are secured to other struts (not specially referenced) in the lower wing 26 of the air-frame. The cage $C_1$ serves to distribute the weight of the occupant and also the weight and thrust developed by the power pack 11 which is secured to the cage as described hereinafter. Details of the angular relationship of the struts of the cage are schematically illustrated in FIG. 7.

Figure 2:
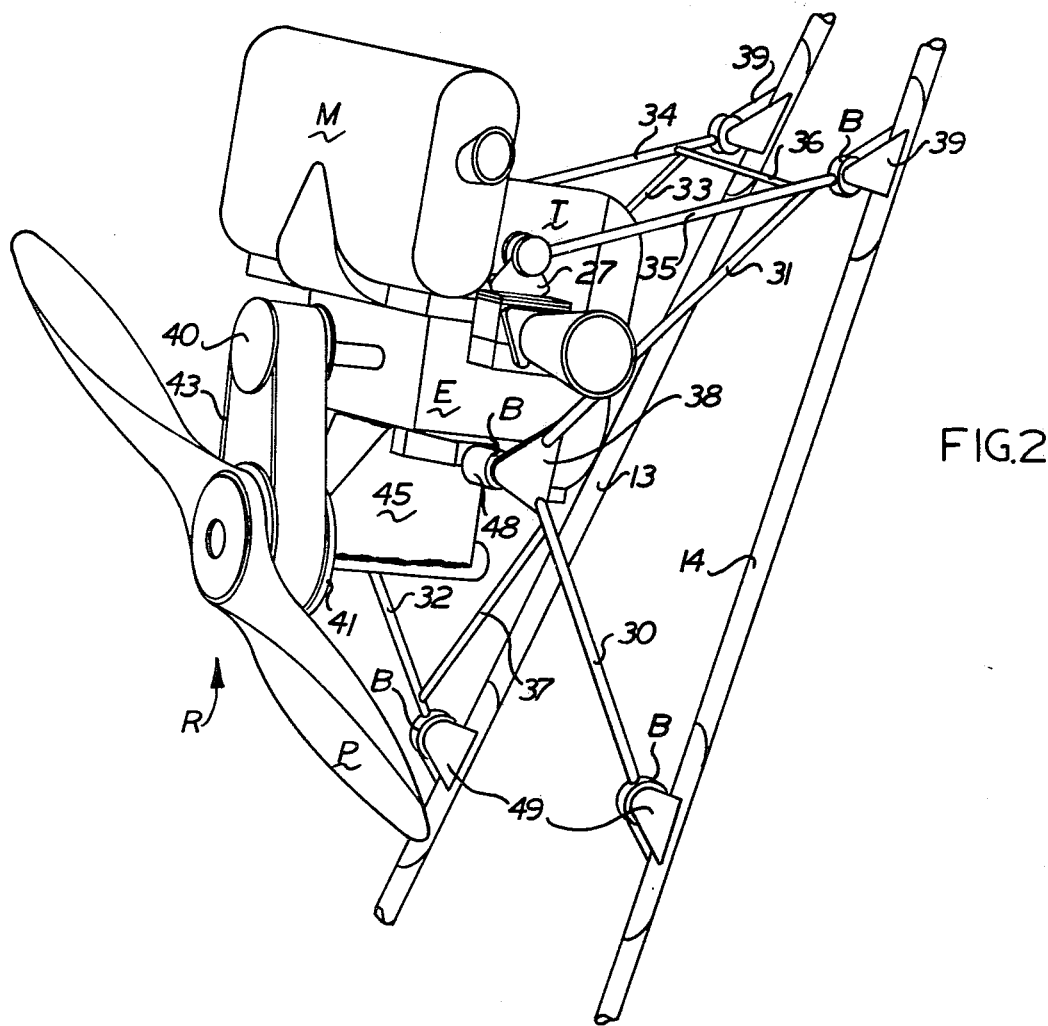
FIG. 2 is a perspective elevational view of a power pack as used in the bi-plane illustrated in FIG. 1, showing a reduction-drive unit mounted to an engine as a power pack, and power pack struts for mounting the power pack to the air-frame.
Figure 6:
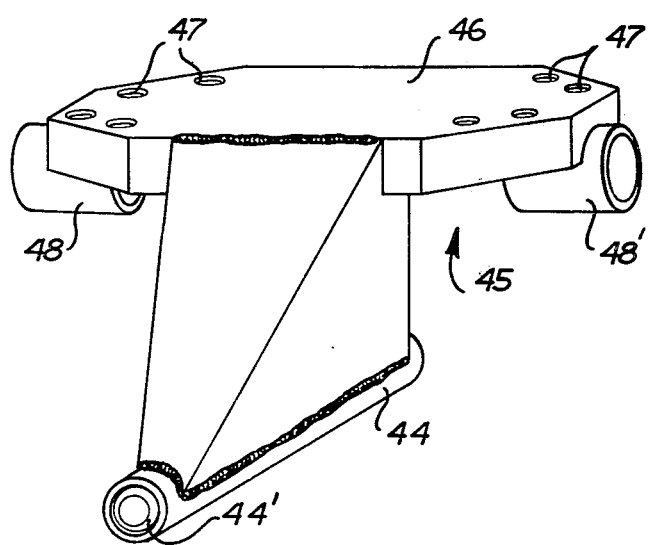
FIG. 6 is a front elevational perspective view of the mounting means for coupling the reduction-drive unit to the engine, and the engine, in turn, to the air-frame of a hang glider.
Figure 3:
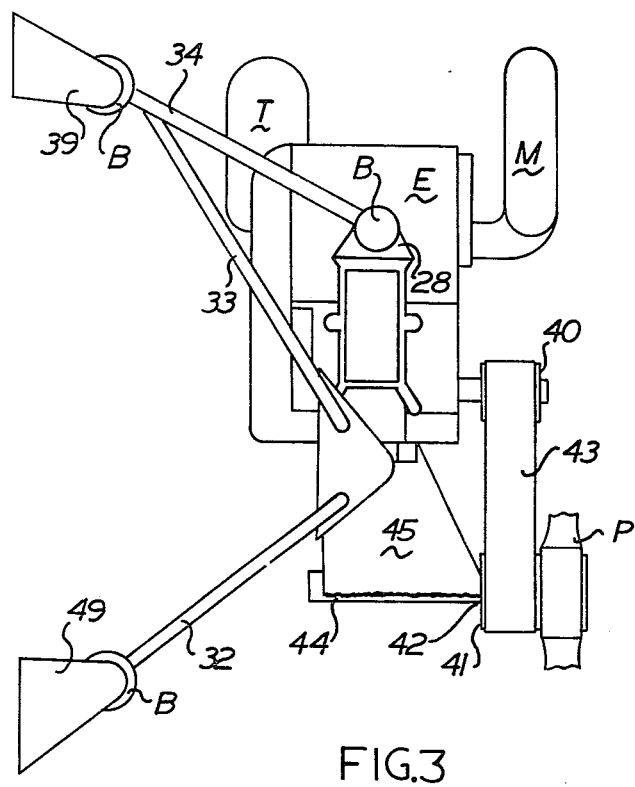
FIG. 3 is a side elevational view of the power pack showing the parallel closely spaced-apart relationship between the crankshaft of the engine and the propeller shaft.

Referring now to FIGS. 2 and 3 there is shown a perspective elevational view of the power pack 11 mounted with brackets 27 and 28 and novel mounting means referred to herein as a reduction mount 45 in a power pack framework of struts, referred to herein for brevity as pack struts 30-36. The reduction mount 45 is illustrated in perspective, in a detail view, in FIG. 6. In the framework there is provided a right side pair of pack struts 30 and 31, and a left side pair of pack struts 32 and 33, so that struts 30 and 31 of the right side pair are angularly fixedly disposed relative to each other, as are the struts 32 and 33 of the left side pair. It will be seen that reference to "right" and "left" is made relative to the position of the occupant in flight position. The angle between the struts 30 and 31 is preferably about 90°, and is the same as that between the struts 32 and 33. At the apex, the struts are 30 and 31 are held together by a plate 38 to which they are secured; similarly struts 32 and 33 are held together by a plate 38' (not visible in this view). Other pack struts 34 and 35 are provided on each side of the engine, and the ends of the struts are provided with rubber or other elastomer inserts B which function as shock absorber blocks to damp vibrations of the engine. One end of each strut 34 and 35 is secured to the brackets 27 and 28 (visible in FIG. 3) on the right and left sides respectively of the engine, and the other ends are secured with bolts through the rubber inserts B, to power pack mounting brackets 39 on the air-frame struts 13 and 14 respectively. A pack strut 36 welded at its ends to struts 34 and 35 maintains them in desired spaced apart relationship and lends rigidity to the power pack framework. Preferably struts 31 and 33 are also welded to struts 35 and 34 respectively for strength. For the same reason, namely strength, a pack strut 37 is welded near its ends to diagonally opposite ends of struts 30 and 32 which, like struts 34 and 35, are also secured to power pack mounting brackets 49 on the air-frame struts 13 and 14, with bolts through rubber inserts B in the ends of the struts. Bolts through plates 38 and 38' secure struts 30, 31, 32 and 33 to reduction mount 45 as is described hereinafter. Thus, in combination, the power pack framework of pack struts provides an approximately symmetrical distribution of power pack weight on mounting struts 13 and 14.

When the power pack is mounted as described to the air-frame, the engine E and reduction-drive unit R are aft, that is, behind the occupant positioning means $C_1$, the direction of flight of the hang glider being considered the forward direction. The reduction drive unit R transmits power from a first relatively small drive timing gear 40, to a larger driven timing gear 41 which is preferably keyed to a propeller shaft 42 (see FIG. 3). The drive gear 40 on one end of the crankshaft of engine E effectively reduces the speed of the engine when it rotates the driven gear 41. One end (the fore end) of the propeller shaft 42 is mounted for rotation in a first bearing means 44' (see FIG. 6) held in a bearing housing 44 of the reduction mount 45. To the other end of the propeller shaft 42 is mounted a propeller P. The reduction mount 45 also includes a platform member 46 provided with plural passages 47 through which it is bolted directly to the engine E so that the bearing housing 44 is disposed directly below the engine. The platform member 46 has welded to it oppositely disposed stub mounts 48 and 48' fitted with elastomer vibration damping means B through which bolts secure plates 38 and 38' to the reduction mount 45. Vibrations from the engine and propeller are thus damped before they are transmitted to the air-frame struts 13 and 14, and then they are further damped by inserts B in the ends of the power pack struts where they are secured to the air-frame struts 13 and 14.

As is shown in FIGS. 2 and 3, the propeller shaft 42 is journalled in the first bearing means 44' directly below the crankshaft of the engine E so that they are together in an essentially vertical plane through the longitudinal axis of the hang glider. A timing belt 43 drivingly engages the drive and driven timing gears, so that a desired reduction in speed of crankshaft rotation is transmitted to the propeller shaft. Typically a reduction of about 2:1 is used so that when the crankshaft is rotating at 6500 rpm the propeller shaft turns at 3250 rpm and when the crankshaft rotates at 9,000 rpm the propeller shaft rotates at 45000 rpm. It has been found by trial and error that it is essential that the speed of rotation of the propeller shaft never reach or exceed 5000 rpm.

It is preferred that the propeller shaft be slightly offset relative to the longitudinal axis of the hang glider. By "slightly offset" I mean that the longitudinal axis of the propeller shaft is at an angle of less than about 5°, and preferably from about 1° to about 3°, not visible in the drawing, relative to the longitudinal axis of the hang glider.

Figure 4:
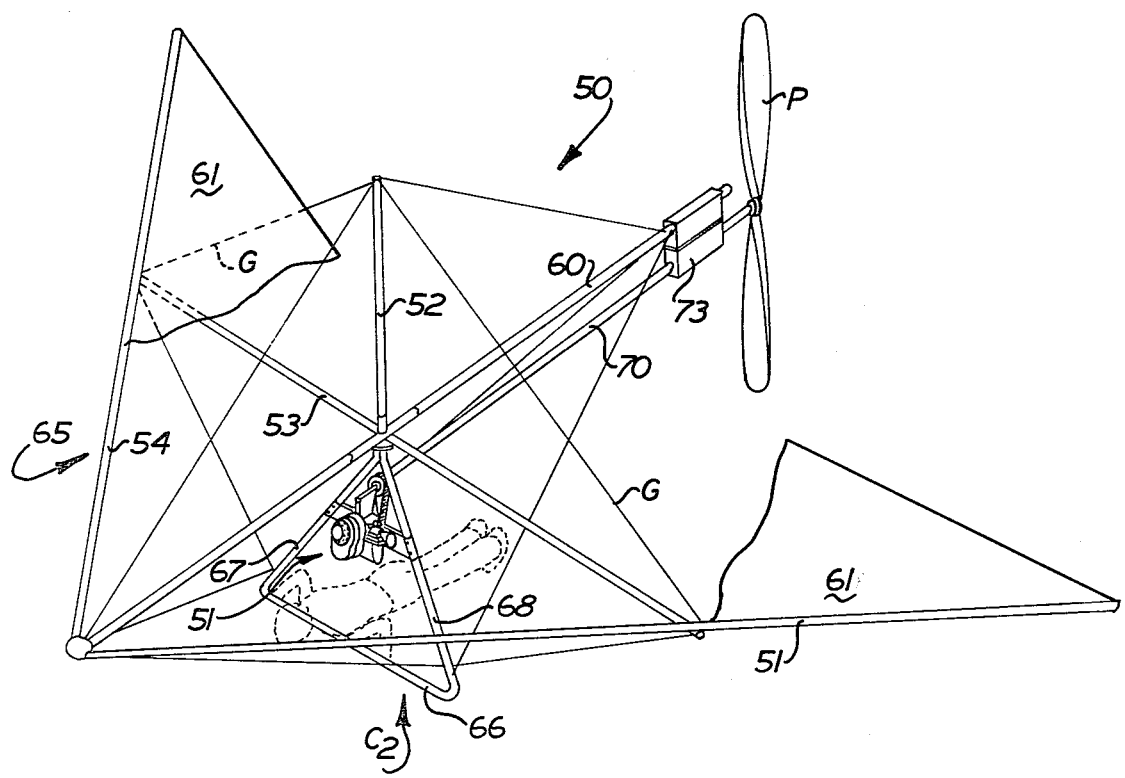
FIG. 4 is a perspective obliquely downward view of a single wing hang glider as viewed from the front, that is, facing the glider as it approaches in flight. The propeller is mounted in the rear, and the engine near the nose of the hang glider.

In another preferred embodiment of the invention, there is shown in FIG. 4 a perspective elevational view of a single wing hang glider having an air-frame of the single wing type, preferably with a rigid wing, indicated generally by reference numeral 50, and a power pack, indicated generally by reference numeral 51, which is demountably secured to the air-frame 65. The airframe comprises a structural framework of elongated members or air-frame struts 52–60 (not all referenced), preferably of tubular light-weight metal or fiber reinforced materials, upon some of which struts a laminar skin 61 of suitable fabric is tightly stretched, so as to provide an air foil of sufficient strength to fly the occupant pilot. In a flexible wing glider the laminar skin is not tightly stretched, and it is free to alter its air-foil characteristics. Strut 60 is a central air-frame strut, referred to as the keel, about which the single wing hang glider is symmetrical.

In the single wing hang glider, as in the previously described embodiment of a bi-plane hang glider, there is provided a central occupant positioning means $C_2$, which is suspended from air-frame 65. The central occupant positioning means or cage is preferably a triangular control member $C_2$ having a generally horizontal control member strut 66 and symmetrical side struts 67 and 68 which converge near the apex of the triangular control member. The struts 67 and 68 are symmetrical about a vertical plane through the longitudinal axis of the hang glider, and near the apex are secured to the keel 60 of the air-frame 65. A vertical air-frame strut 52 extends directly above the triangular control member $C_2$ at right angles to the horizontal keel 60. A wing cross strut 53 is secured at its ends to wing struts 54 and 55, maintaining them in a desired spaced apart relationship with each other. The struts 52, 53 and 60 have a common point of intersection from which common point the triangular control member $C_2$ depends. A plurality of guy wires or cables, identified by the reference symbol G, tension the strut 52 from near the ends of the keel 60, and the ends of the cross strut 53. The triangular control member $C_2$, which is also the occupant positioning means, is secured, near each end of the control member strut 66, to other struts, as shown, of the air-frame 50, by cables G. The occupant of the hang glider, during flight, is supported by the triangular control member $C_2$ and controls the flight of the glider by shifting his body weight, optionally also with the aid of manual controls. As is schematically illustrated in phantom outline, the occupant grips strut 66 with his hands and the weight of his lower body is supported by a harness suspended from a hook 69 hanging down from the apex of the triangular control member $C_2$.

The engine E is removably mounted near the apex of the triangular control member $C_2$ with a mounting plate 62, so that the weight of the engine E is distributed upon struts 67 and 68 of the control member, and the engine and mounting plate 62 are fore, that is, forward in relation with triangular control member $C_2$. The crankshaft axis is preferably parallel to the keel 60, in a vertical plane about which the wing 65 is symmetrical, as shown in FIG. 4, or the crankshaft axis may be non-aligned relative to the keel 60. By "non-aligned" I mean that the crankshaft axis may be transversely spaced apart and generally parallel to the keel, rather than directly beneath the keel and in the same vertical plane.

Figure 5:
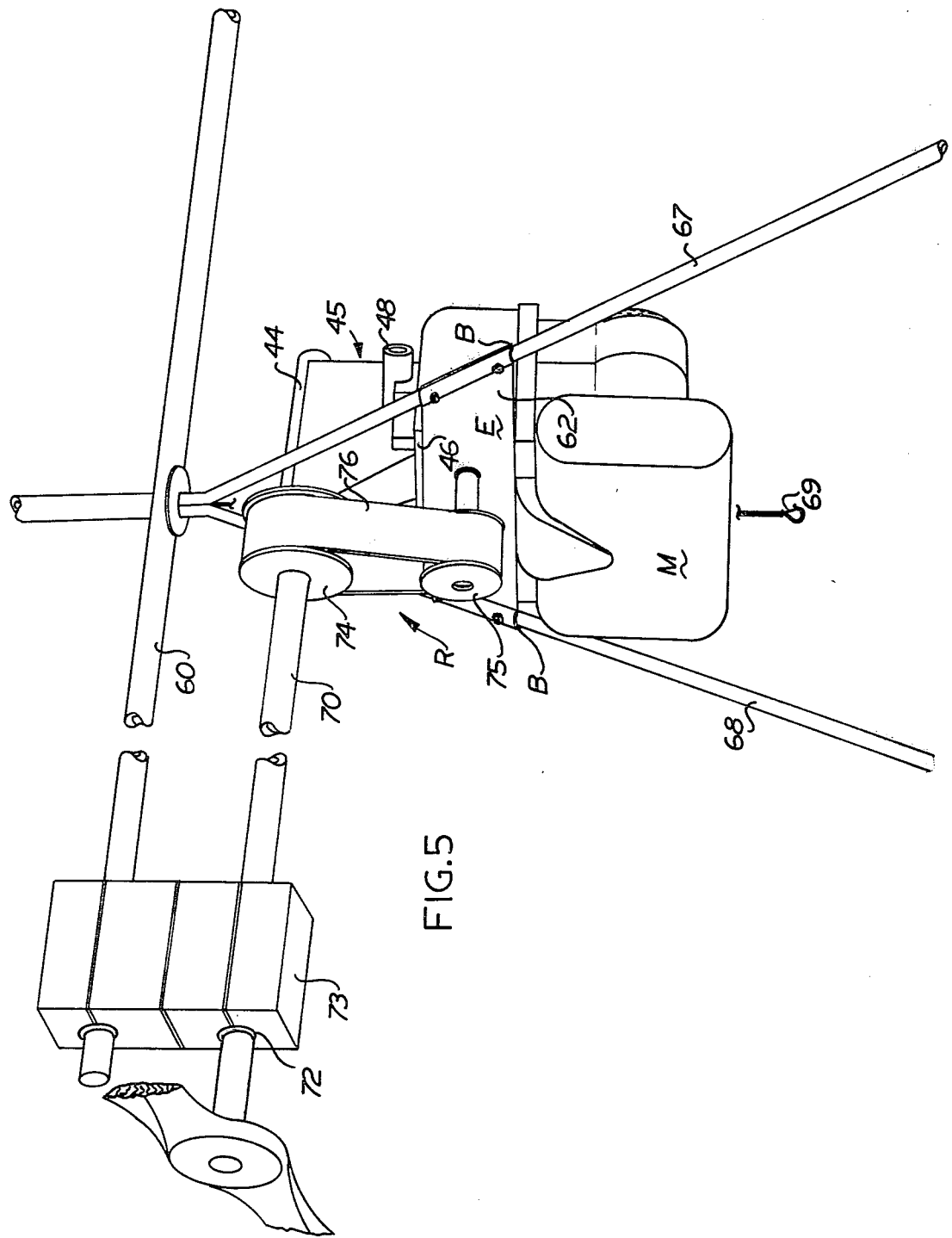
FIG. 5 is a perspective obliquely upward view of the single wing hang glider illustrated in FIG. 4, as viewed from the rear, that is, facing the direction of flight.

Referring now to FIG. 5 there is shown a perspective view of the power pack 51 mounted "upside down" to struts 67 and 68 of the single wing hang glider illustrated in FIG. 4. As in the bi-plane embodiment described hereinabove, the engine E is provided with a reduction mount 45, as described in the previous embodiment, removably secured thereto, which serves to position the reduction drive-unit R. The reduction mount 45 includes a platform member 46 which in turn includes a bearing housing 44 and a first bearing means 44' maintained at a fixed distance, less than 25.4 cms from the axis of rotation of the crankshaft of engine E axis. As is illustrated, the power pack is preferably also provided with a muffler M and a fuel tank T (not shown). Vibration damping means such as rubber or other elastomer inserts B are provided between each control member strut 67 and 68 and the mounting plate 62.

A propeller P is fixedly mounted near one end (the aft end) of a long propeller shaft 70 for rotation with the shaft. The propeller shaft 70, near the same aft end is journalled in a second bearing means, indicated generally by reference numeral 72. The bearing means 72 includes a bearing (not shown) held in a split pillow block 73 which is through-bolted to the keel 60. Near the other end (forward end) of the propeller shaft 70, there is fixedly mounted a driven timing gear 74 having a relatively larger diameter than a drive timing gear 75 fixedly mounted for rotation with the engine's crankshaft. A timing belt 76 drivingly engages the timing gears. The propeller shaft 70, near the driven timing gear 74, is journalled in the first bearing means 44' in the reduction mount 45. The first and second bearing means are preferably mounted so as to maintain the propeller shaft 70 beneath the keel 60, and to bias the shaft 70 at a slight angle, less than about 5° (degrees), to the keel; that is, in a plan view of the hang glider, propeller shaft 70 is set at an angle less than 5° from the keel 60, the side to which the shaft 70 is angled being determined by the direction of rotation of the crankshaft. The slight bias of the shaft 70 helps neutralize the effect of engine torque, in flight, and facilitates control of the hang glider. A bias of from about 1° to about 3° is most preferred.

I claim:

1. In a powered hang glider which is foot-launched by a single occupant for flight in the cruising speed range from about 25 miles per hour (mph) to about 35 mph, and foot-landed at the end thereof, comprising an air-frame and a two-cycle internal combustion engine mounted in said air-frame which includes an occupant positioning means supported for flight by at least one wing member, and said positioning means includes at least two elongated members symmetrically disposed about a vertical plane through the longitudinal axis of said hang glider, the improvement comprising, a reduction drive unit drivingly engaging said engine which operates in the range from about 5000 rpm to about 10,000 rpm, with a fixed pitch relatively large diameter propeller in the range from about 0.9 meter to about 1.4 meters, said reduction drive unit including:
 (i) a relatively small drive means fixedly disposed near one end of the crankshaft of said engine,
 (ii) a relatively large driven means fixedly disposed for rotation with a propeller shaft mounted for rotation in a first bearing means,
 (iii) a reduction mount removably secured to said engine, for mounting said first bearing means in transversely spaced apart relationship with said engine so that the longitudinal axis of said first bearing means is no further than 25.4 cm from the axis of rotation of said crankshaft, said propeller shaft being slightly offset at an angle less than 5° from said longitudinal axis, wherein said reduction mount comprises,
  (a) a platform mounting member directly secured to said engine,
  (b) aligned oppositely disposed stub mounts fitted with vibration damping means between said mounting means and said elongated members, and between said mounting means and said reduction mount, to damp vibrations of said engine and said propeller, said stub mounts extending from said platform,
  (c) a bearing housing for said first bearing means for said propeller shaft, said bearing housing extending downwardly from said platform member to support said propeller shaft offset less than 5° from the longitudinal axis of said hang glider,
 (iv) driving means for drivingly engaging said small drive means and said large driven means so as to rotate said propeller in the range from about 2500 rpm but less than 5000 rpm, and
 (v) mounting means for selectively mounting said engine in said air frame, fore or aft on said elongated members of said positioning means.

2. In a powered hang glider of the single wing category having a longitudinal axial keel, which hang glider is foot-launched by a single occupant for flight in the cruising speed range from about 25 miles per hour (mph) to about 35 mph, and foot-landed at the end thereof, comprising an air-frame and a two-cycle internal combustion engine mounted in said air-frame which includes an occupant positioning means supported for flight by at least one wing member, and said positioning means includes at least two elongated members symmetrically disposed about a vertical plane through the longitudinal axis of said hang glider, the improvement comprising, a reduction drive unit drivingly engaging said engine which operates in the range from about 5000 rpm to about 10,000 rom, with a fixed pitch relatively large diameter propeller having a pitch in the range from about 9 ins to about 16 ins and a diameter in the range from about 0.9 meter to about 1.4 meters, said reduction drive unit including:
 (i) a relatively small drive means fixedly disposed near one end of the crankshaft of said engine,
 (ii) a relatively large driven means fixedly disposed for rotation with a propeller shaft mounted for rotation in a first bearing means,
 (iii) a reduction mount removably secured to said engine, for mounting said first bearing means in transversely spaced apart relationship with said engine so that the longitudinal axis of said first bearing means is no further than 25.4 cm from the axis of rotation of said crankshaft, said propeller shaft being slightly offset at an angle less than 5° from said longitudinal axis,
 (iv) driving means for drivingly engaging said small drive means and said large driven means so as to rotate said propeller in the range from about 2500 rpm but less than 5000 rpm, and
 (v) mounting means for mounting said engine in said air frame, fore on said elongated members, that is, in front of said positioning means.

3. The powered hang glider of claim 2 wherein said keel has secured thereto, near said propeller, a split pillow block for a second bearing means in which said propeller shaft is rotatably held at an angle, slightly less than 5° from the longitudinal axis of said hang glider.

* * * * *